(12) United States Patent
Glusiec

(10) Patent No.: US 11,085,838 B2
(45) Date of Patent: Aug. 10, 2021

(54) FORCE/TORQUE SENSOR HAVING SERPENTINE OR COILED DEFORMABLE BEAMS AND OVERLOAD BEAMS

(71) Applicant: ATI Industrial Automation, Inc., Apex, NC (US)

(72) Inventor: Andrew Glusiec, Apex, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 0 days.

(21) Appl. No.: 16/682,475

(22) Filed: Nov. 13, 2019

(65) Prior Publication Data

US 2020/0284667 A1 Sep. 10, 2020

Related U.S. Application Data

(60) Provisional application No. 62/816,191, filed on Mar. 10, 2019.

(51) Int. Cl.
| | |
|---|---|
| *G01L 1/22* | (2006.01) |
| *B25J 13/08* | (2006.01) |
| *G01L 5/00* | (2006.01) |
| *G01L 3/10* | (2006.01) |
| *G01L 5/161* | (2020.01) |

(52) U.S. Cl.
CPC ......... *G01L 1/2206* (2013.01); *B25J 13/085* (2013.01); *G01L 1/225* (2013.01); *G01L 1/2287* (2013.01); *G01L 3/108* (2013.01); *G01L 5/0071* (2013.01); *G01L 5/161* (2013.01)

(58) Field of Classification Search
CPC ..... G01L 1/2206; G01L 1/2287; G01L 1/225; G01L 5/0071; G01L 5/161; G01L 3/108; B25J 13/085
See application file for complete search history.

(56) References Cited

U.S. PATENT DOCUMENTS

| | | | | | |
|---|---|---|---|---|---|
| 4,621,533 | A | * | 11/1986 | Gindy .................. | G01L 1/2262 73/862.045 |
| 4,854,179 | A | * | 8/1989 | Haggstrom ........... | G01L 1/2231 73/862.632 |
| 5,063,788 | A | * | 11/1991 | Ch'Hayder ........... | G01L 5/1627 73/862.043 |

(Continued)

FOREIGN PATENT DOCUMENTS

EP 0310095 A1 9/1988

*Primary Examiner* — Jonathan M Dunlap
(74) *Attorney, Agent, or Firm* — Coats & Bennett, PLLC

(57) ABSTRACT

A force/torque sensor includes a plurality of serpentine or spiral deformable beams connecting a TAP and MAP. These classes of shapes increase the overall length of the deformable beams, which reduces their stiffness. In addition to the deformable beams is a plurality of straight overload beams, each connected at a first end to one of the TAP and MAP, and separated from the other of the TAP and MAP at the second end by an overload gap of a predetermined width. Over a first range of forces and torques, strain gages on the deformable beams transduce compressive and tensile strains into electrical signals, which are processed to resolve the forces and torques. Over a second range of forces and torques greater than the first range, the overload beams close the overload gap, establishing rigid contact to both the TAP and MAP. The stiffness of the sensor in the second range of forces and torques is greater than over the first range.

27 Claims, 12 Drawing Sheets

(56) References Cited

U.S. PATENT DOCUMENTS

| | | | | |
|---|---|---|---|---|
| 5,894,094 A | * | 4/1999 | Kuchler | G01L 1/2262 |
| | | | | 73/862.044 |
| 7,743,672 B2 | * | 6/2010 | Kurtz | G01N 3/08 |
| | | | | 73/862.046 |
| 8,438,938 B1 | * | 5/2013 | Cavanagh | G01L 1/2231 |
| | | | | 73/862.629 |
| 9,038,484 B2 | * | 5/2015 | Seibold | G01L 5/1627 |
| | | | | 73/862.045 |
| 10,067,019 B2 | * | 9/2018 | Bradford | G01L 3/108 |
| 10,422,707 B2 | * | 9/2019 | Bradford | G01L 3/108 |
| 2002/0059837 A1 | * | 5/2002 | Meyer | G01L 1/2231 |
| | | | | 73/862.042 |
| 2002/0178841 A1 | | 12/2002 | Kobayashi et al. | |
| 2004/0045372 A1 | * | 3/2004 | Liu | G01L 1/22 |
| | | | | 73/862.041 |
| 2006/0213287 A1 | * | 9/2006 | Sakano | G01L 5/162 |
| | | | | 73/862.042 |
| 2012/0234104 A1 | * | 9/2012 | Seibold | G01L 5/1627 |
| | | | | 73/862.045 |
| 2012/0266694 A1 | * | 10/2012 | Szasz | G01L 5/1627 |
| | | | | 73/862.044 |
| 2015/0135856 A1 | * | 5/2015 | Kim | G01L 5/1627 |
| | | | | 73/862.045 |
| 2015/0323398 A1 | * | 11/2015 | Lauzier | B25J 9/0081 |
| | | | | 73/862.08 |
| 2016/0102724 A1 | * | 4/2016 | Potter | G01B 11/16 |
| | | | | 267/161 |
| 2017/0205296 A1 | * | 7/2017 | Bradford | G01L 1/22 |
| 2017/0211999 A1 | * | 7/2017 | Bradford | B25J 19/0095 |
| 2019/0064015 A1 | | 2/2019 | Wang et al. | |
| 2019/0271604 A1 | * | 9/2019 | Li | G01L 5/1627 |
| 2019/0275681 A1 | * | 9/2019 | Bohme | G01L 3/108 |
| 2020/0191665 A1 | * | 6/2020 | Fleissner | G01L 19/04 |

* cited by examiner

FORCE/TORQUE SENSOR HAVING SERPENTINE OR COILED DEFORMABLE BEAMS AND OVERLOAD BEAMS

FIELD OF INVENTION

The present invention relates generally to force/torque sensors, and in particular to a compact sensor exhibiting a high ratio of stiffness after overload activation to stiffness prior to overload activation, by the use of serpentine or spiral deformable beams and overload beams.

BACKGROUND

Robotics is a growing, and increasingly important, field in industrial, medical, aerospace, scientific, and other applications. In many cases, in which a robot arm or a tool attached thereto contacts an surface or object such as a workpiece, the force and/or torque applied must be closely monitored. Accordingly, a force/torque sensor is an important part of many robotic systems.

Force/torque sensors for robotics applications are known in the art. For example, robotic tool force/torque sensors are described in U.S. Pat. Nos. 10,422,707 and 10,067,019. FIGS. 1 and 2 of the former are included herein, as an introduction to the concept of strain gage based force/torque sensors. Within this class of sensors, many variations are known in the art, and the particular design depicted in FIGS. 1 and 2 is not meant to be representative, or limiting.

As described in the above-referenced patents, and with reference to FIG. 1, one type of force/torque sensor 10 uses strain gages 1-6 to measure the deformation of small beams 16a-c connecting two mechanical parts—one connected to the robot arm and the other connected to a robotic tool (or a mechanical coupling to the tool) or other end effector. For example, a central "hub," referred to in the art as a Tool Adapter Plate (TAP) 12 may be connected to a tool. Another body arranged annularly around, and spaced apart from, the TAP, referred to in the art as a Mounting Adapter Plate (MAP) 14, may be connected to a robotic arm (or vice versa). The TAP 12 and MAP 14 are connected to each other by a plurality of relatively thin (and hence mechanically deformable) beams 16a, 16b, 16c, arranged radially around the TAP 12—in this design, resembling the spokes of a wheel. Relative force or torque between objects respectively attached to the TAP 12 and MAP 14 attempt to move the MAP 14 relative to the TAP 12, resulting in slight deformation, or bending, of at least some of the beams 16, as depicted in FIG. 2 (not to scale). The deformation is enhanced by very thin flexures 17 connecting each beam 16 to the MAP 14.

Strain gages 1-6 are affixed to one or more surfaces of each beam 16. The gages 1-6 translate strains at the beams' surfaces, caused by mechanical deformation of the beams, into electrical signals. For example, the gages 1-6 could be strain gages that respond to some combination of tensile, compressive, and shear strains by altering their resistance in response to elongation or contraction. Once calibrated, signals from strain gages 1-6 on all beams 16 are processed together to resolve the magnitude and direction of relative force and/or torque between the robot arm and an attached tool. As used herein, the term "strain gage" refers to any sensor or transducer (or combination of sensors or transducers) that predictably responds to mechanical deformation of a material, which response can be detected, quantified, and used in resolving the forces or torques causing the deformation. The above-cited patents provide greater detail on specific aspects of the particular force/torque sensors 10 for which inventive improvements are described.

Force/torque sensors of this general type work well, within a limited range of force and/or torque values. A typical sensor is formed from a rigid material, such as aluminum or steel, which will not deform at all for very low applied forces. Throughout a limited range of force/torque values, the beams or other deformable members deform slightly, and the resultant tensile and compressive forces are detected by strain gages and quantified by measurement electronics. As the magnitude of applied forces or torques increases, however, due to the deformable members being fairly short and very stiff, they will experience very little further displacement before suffering metal fatigue or yielding—which reduces or terminates, respectively, the sensor's useful life. Force/torque sensors are typically manufactured in different sizes, and specified for operations that will experience only force/torque values within their respective specified ranges. However, not all robotic applications enjoy controlled environments. For example, robots deployed in real world environments, such as in law enforcement, military, space exploration, or the like, may encounter temporary or even sustained forces and torques above their design rating.

One way to prevent damage to a force/torque sensor in an overload situation is the provision of overload features. One type of overload feature is referred to herein as an "overload beam" (as distinguished from a "deformable beam," which may be instrumented). One example is depicted in FIG. 1 of Chinese published application CN 103528726, included herein as FIG. 3. In this sensor, deformable beams 2 connect a TAP 1 to a MAP 4 in the +/−x and y directions. The deformable beams 2 are instrumented with strain gages R17-R20, R21-R24, R25-R28, and R29-R32 on opposite sides of each beam 2. Interspersed radially between the deformable beams 2, at 45-degree angles, are a set of overload beams 3. The overload beams 3 are not instrumented with strain gages. The overload beams 3 are connected at one end to the TAP 1, but are separated from contact with the MAP 4 at the other end by a narrow gap, e.g., a few thousandths of an inch. The width of this gap is designed to allow free movement of the overload beam 3 throughout the normal range of deformation of the deformable beams 2—that is, it allows the deformable beams 2 connecting the TAP 1 and MAP 4 to move (deform) throughout their designed range of motion, allowing slight relative motion between the TAP 1 and MAP 4. However, as an applied force or torque reaches the maximum value for which the sensor is designed, and the deformable beams 2 deform by their maximum designed amount, one or more overload beams 3 will close the gap and make hard contact with the MAP 4. The overload beams 3 are stiffer/stronger than the deformable beams 2; hence further applied force/torque does not further deform the deformable beams 2, as the overload beams 3 absorb the excess force and prevent any further relative motion between the TAP 1 and MAP 4.

FIG. 4, from Chinese published application CN 1283985, depicts a different form of overload feature. Deformable beams 2 connect a TAP 6 to a MAP 9. Relative horizontal movement of the TAP 6 and MAP 9, at the limit of deformation of the deformable beams 2, is constrained by a pin 5 rigidly attached to the MAP 9, and disposed within a bore 8 in the TAP 6. The bore 8 has a radius slightly larger than that of the pin 5, by $\delta_1$. Relative vertical movement of the TAP 6 and MAP 9 is constrained by their spacing—the TAP 6 and MAP 9 are separated by a gap having a width $\delta_2$. Other configurations of overload features are known in the art.

Conventional overload features, such as the gaps depicted in FIGS. 3 and 4, require very tight tolerances to be maintained between mating overload features. This may increase the cost of the force/torque sensor. Additionally, achieving the very tight tolerances may require machining/aligning of components after assembly into a sensor, which risks damaging the sensor and can increase lead times of machined parts as it adds a separate step to the manufacturing process. Furthermore, if there are tight tolerances and the sensor is offset from its expected zero-load position slightly, then the ranges which the sensor can accurately measure will not be centered around the zero-load position, which can lead to early failure of the sensor or the inability of the sensor to accurately measure throughout its entire stated range.

The stiffness of members comprising the overload feature (i.e., the overload beams 3 of FIG. 3, or the pins 5 of FIG. 4) is typically somewhat greater than the stiffness of deformable members in the sensor, which undergo deformation that is sensed, measured, and translated to forces and torques. Ideally, once the overload feature activates—e.g., once the gap is eliminated and the overload features make hard contact between TAP and MAP—all further deformation (measured as strain) in the deformable members should stop increasing. However, in reality, if the stiffness of the overload features is similar to that of the deformable members, then applying yet more load to the sensor will continue to increase the stresses measured by the strain gages. This fact sets a limit on how much force or torque can be applied to the sensor, after the overload activation point, before the sensor structure yields—in spite of the overload feature.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a force/torque sensor includes a plurality of serpentine or spiral deformable beams connecting a TAP and MAP. For each serpentine deformable beam, at least one directed path taken down the centerline of the serpentine deformable beam from a point of attachment to the TAP to a point of attachment to the MAP (or vice versa) successively deviates from an instantaneous straight line at least once to the left and at least once to the right. For each spiral deformable beam, at least one directed path taken down the centerline of the spiral deformable beam from a point of attachment to the TAP to a point of attachment to the MAP (or vice versa) deviates from an instantaneous straight line to one of the left or the right, and wherein the cumulative sum of such deviation is greater than 90-degrees. These classes of shapes increase the overall length of the serpentine or spiral deformable beam, which reduces its stiffness. Interspersed with the serpentine or spiral deformable beams is a plurality of overload beams, which may be straight. Each overload beam is connected at a first end to one of the TAP and MAP, and separated from the other of the TAP and MAP at the second end by an overload gap of a predetermined width. During a first range of forces and torques, the serpentine or spiral deformable beams deform under relative motion between the TAP and MAP, and strain gages thereon transduce strains into electrical signals, which are processed to resolve the forces and torques. Over a second range of forces and torques greater than the first range, one or more overload beams close the overload gap, establishing rigid contact to both the TAP and MAP, nominally halting further relative motion between the TAP and MAP. The stiffness of the sensor in the second range of forces and torques is greater than over the first range. This high ratio of stiffness yields a sharp inflection in the strain/force curve at the point of overload actuation, with a low slope as increasing load is applied. This increases the number of cycles in which the sensor can go into overload condition before fatiguing the metal, and increases the maximum force/torque the sensor can withstand without yielding or breaking.

One embodiment relates to a force/torque sensor. The sensor includes a Tool Adapter Plate (TAP) operative to be connected to a first object and a Mounting Adapter Plate (MAP) operative to be connected to a second object. The sensor also includes one or more deformable beams connecting the TAP to the MAP. Each deformable beam comprises one of a serpentine deformable beam, wherein at least one directed path taken down the centerline of the serpentine deformable beam from a point of attachment to the TAP to a point of attachment to the MAP successively deviates from an instantaneous straight line at least once to the left and at least once to the right, and a spiral deformable beam, wherein at least one directed path taken down the centerline of the spiral deformable beam from a point of attachment to the TAP to a point of attachment to the MAP deviates from an instantaneous straight line to one of the left or the right, and wherein the cumulative sum of such deviation is greater than 90-degrees. Strain gages are affixed to one or more surfaces of at least some of the serpentine or spiral deformable beams. The strain gages are operative to transduce strains in the serpentine or spiral deformable beam, caused by deformation of the beam, into electrical signals. A measurement circuit is operative to measure, in response to electrical signals from all strain gages, the direction and magnitude of force and torque between the first and second objects.

Another embodiment relates to a force/torque sensor. The sensor includes a TAP operative to be connected to a first object and a MAP operative to be connected to a second object. The sensor also includes one or more serpentine deformable beams connecting the TAP to the MAP, wherein at least one directed path taken down the centerline of the serpentine deformable beam from a point of attachment to the TAP to a point of attachment to the MAP successively deviates from an instantaneous straight line at least once to the left and at least once to the right. Strain gages are affixed to one or more surfaces of at least some of the serpentine deformable beams. The strain gages are operative to transduce strains in the serpentine deformable beam, caused by deformation of the beam, into electrical signals. A measurement circuit is operative to measure, in response to electrical signals from all strain gages, the direction and magnitude of force and torque between the first and second objects.

Yet another embodiment relates to a force/torque sensor. The sensor includes a TAP operative to be connected to a first object and a MAP operative to be connected to a second object. The sensor also includes one or more spiral deformable beams connecting the TAP to the MAP, wherein at least one directed path taken down the centerline of the spiral deformable beam from a point of attachment to the TAP to a point of attachment to the MAP deviates from an instantaneous straight line to one of the left or the right, and wherein the cumulative sum of such deviation is greater than 90-degrees. Strain gages are affixed to one or more surfaces of at least some of the spiral deformable beams. The strain gages are operative to transduce strains in the spiral deformable beam, caused by deformation of the beam, into electrical signals. A measurement circuit is operative to measure, in response to electrical signals from all strain gages, the direction and magnitude of force and torque between the first and second objects.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Although overload features in a force/torque sensor typically have a somewhat greater stiffness than the deformable members that measure strains, in reality it is the ratio of stiffness of the sensor after an overload feature activates, to the sensor stiffness in its normal operating range, that is important in evaluating the overload feature effectiveness. A higher such ratio reduces the rate at which stress increases on the sensor after the overload feature activates, which in turn further increases the maximum force that can be applied to a sensor before failure.

As mentioned above, ideally all sensor motion (i.e., relative motion between the TAP and MAP) stops once the overload feature activates—that is, once the gap is closed and the overload beams or other members make hard contact with the relevant opposing surface. In reality, however, with increased force or torque applied, the sensor parts continue moving, just not as much as prior to the overload feature activation, because the contact between the two sides of the gap is not infinitely stiff. Hence, the ratio of sensor stiffness after overload feature activation, to the sensor stiffness before it, is the critical metric.

Figure 5:
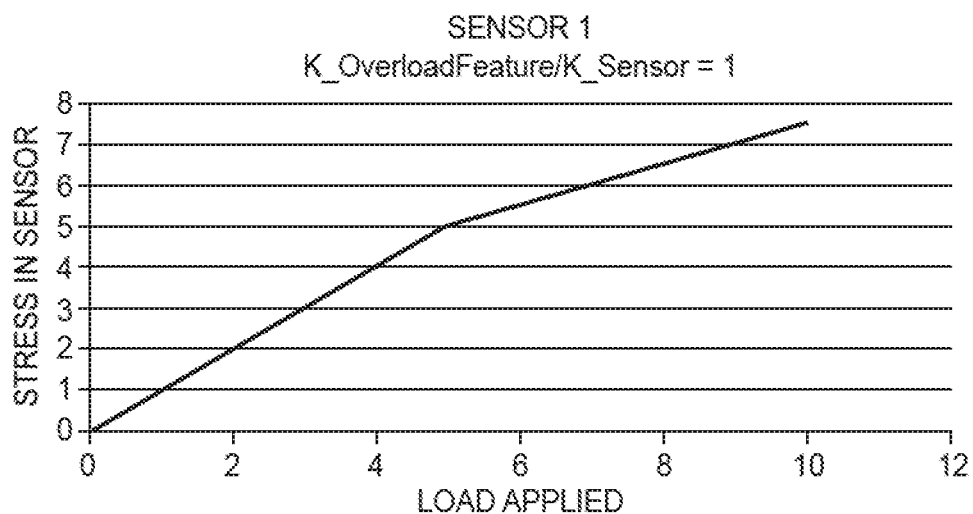
FIG. 5 is a graph of strain vs. load for a sensor with a low ratio of post-to-pre overload activation stiffness.
Figure 6:
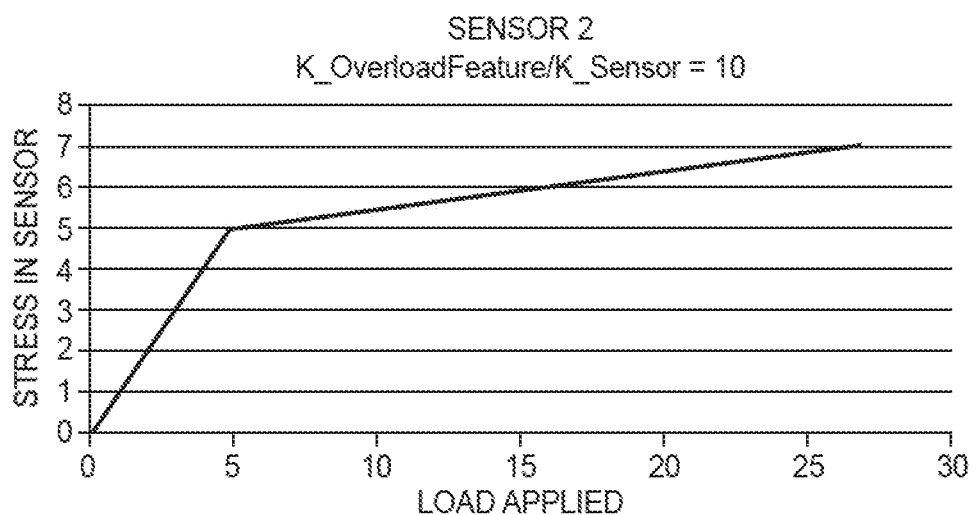
FIG. 6 is a graph of strain vs. load for a sensor with a high ratio of post-to-pre overload activation stiffness.

FIGS. 5 and 6 demonstrate this. These are graphs of two different sensors, depicting a load (force or torque) applied on the x-axis and the maximum stress observed by the sensor on the y axis. Note that the units of force are not important, as they will scale with the size of the sensor. In the first sensor (FIG. 5), the stiffness after actuation of overload features is not much greater than before such activation—that is, k_overload/k_sensor~=1. In the second sensor, the stiffness after actuation of overload features is considerably greater than before such activation—that is, k_overload/k_sensor~=10.

By inspection of FIGS. 5 and 6, one sees that both sensors respond linearly through their designed range—for an applied load of up to 5, both sensors report a corresponding stress of up to 5. Above an applied force of 5, which is the point of overload feature activation, both graphs change slope. In the first sensor, depicted in FIG. 5, the sensor is not much stiffer after overload activation than before, and the stress output increases almost as rapidly with continuing increase in load as before the overload activation.

In contrast, the second sensor, depicted in FIG. 6, is considerably stiffer after overload activation than before it, and the stress output increases much more slowly with continuing increase in load—that is, the graph after the overload feature activation point has a much lower slope.

One goal in designing effective overload features—particularly for force/torque sensors to be deployed in uncontrolled environments—is the ability to apply large forces/torques to the sensor before the sensor experiences metal fatigue, yields, fractures, or breaks into pieces. It is apparent that the second sensor (FIG. 6) meets this goal to a much greater extent than the first sensor (FIG. 5). For example, if both sensors will break at a stress level of 7, the second sensor can take a load of up to 27 before breaking, while the first sensor will break at a load of only 9.

Accordingly, sensors with a stiffness after overload feature activation that is much greater than the sensor stiffness in its normal operating range fair better under overload conditions. Stated differently, making a force/torque sensor, which has overload features, less stiff in its operating range will increase the maximum force it can endure before failure.

Figure 7:
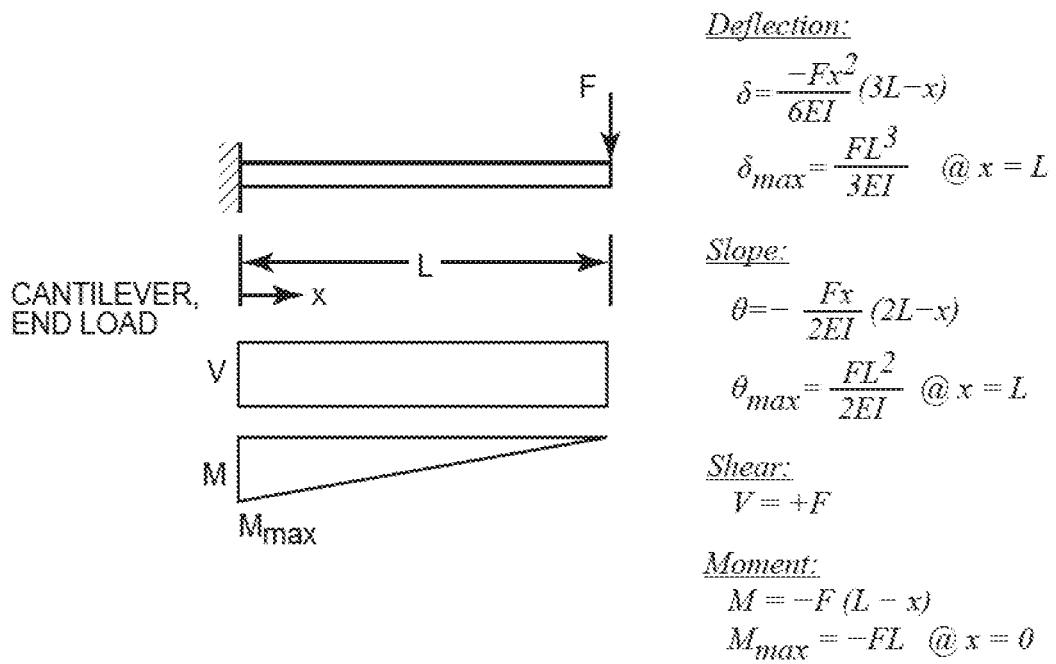
FIG. 7 depicts graphs and equations for static force analysis of a cantilevered beam.

One way to make a deformable-beam type force/torque sensor less stiff in its operating range is to reduce the stiffness of the deformable beams (while maintaining high stiffness of the overload beams, or other overload features). A straightforward way to reduce the stiffness of a beam, without increasing stress in the beam, is to increase its length. The deflection of a beam is proportional to the cube of it length; however, the stress in the beam is only proportional to its length. FIG. 7 depicts the relevant equations, and graphs for shear V and moment M, for a cantilever beam of length L.

Figure 1:
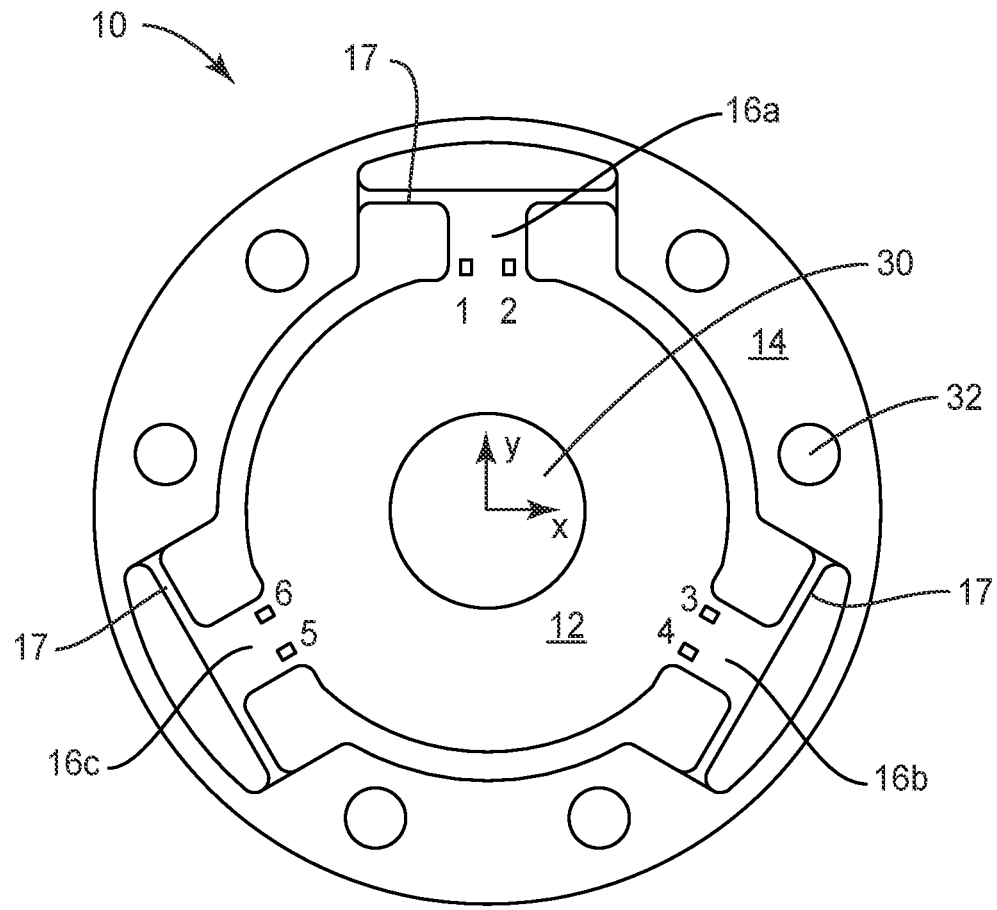
FIG. 1 is a plan view of a prior art force/torque sensor (FIG. 1 of U.S. Pat. Nos. 10,422,707 and 10,067,019).
Figure 2:
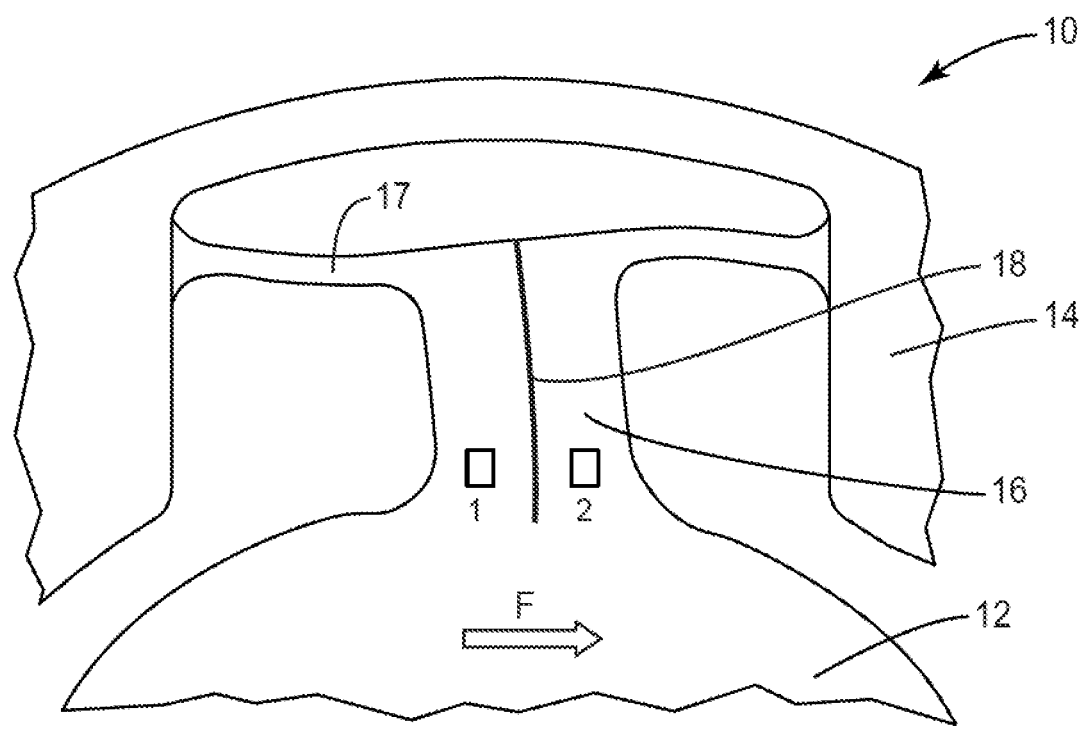
FIG. 2 is an enlarged view of the sensor of FIG. 1 showing deformation of a beam (FIG. 2 of U.S. Pat. No. 10,422,707).
Figure 3:
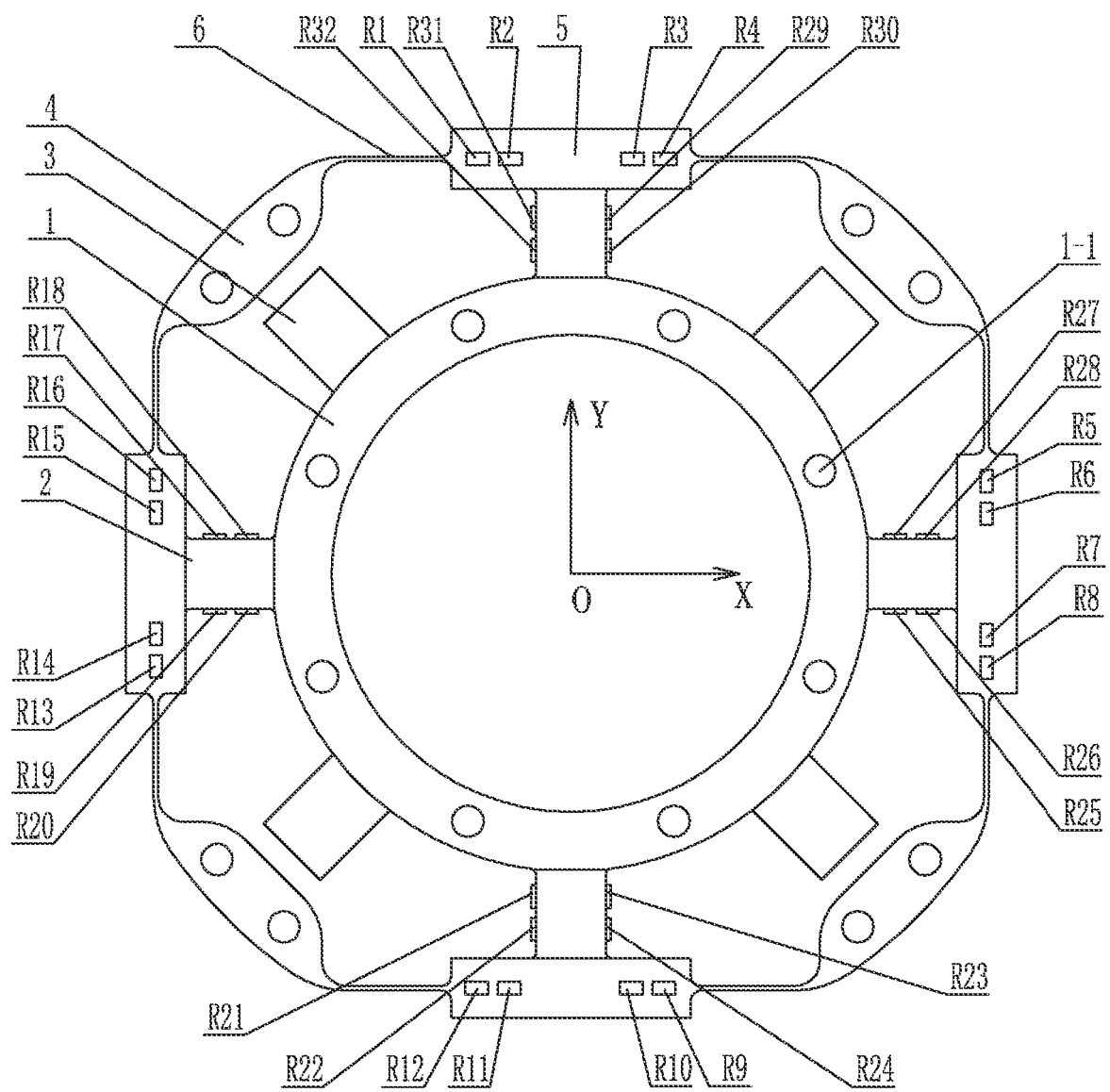
FIG. 3 is a plan view of a prior art force/torque sensor having overload beams (FIG. 1 of CN 103528726).
Figure 4:
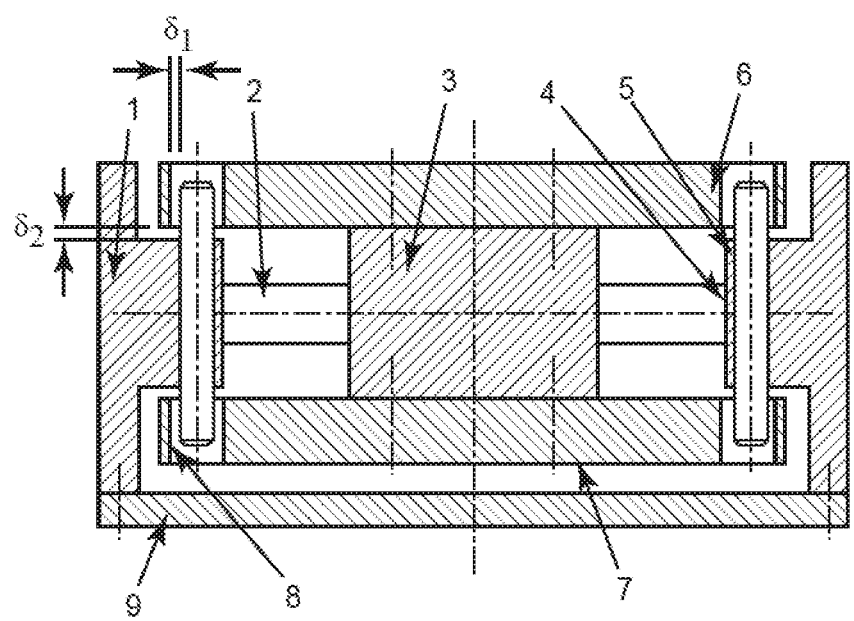
FIG. 4 is a section view of a prior art force/torque sensor having overload pins (FIG. 1 of CN 1283985).

Directly increasing the length of deformable beams is not possible in many sensor designs, such as those depicted in FIGS. 1-3, which are constrained in overall diameter. Furthermore, this would necessarily also increase the length of the overload beams of FIG. 3, decreasing their stiffness and negating the desired increase in the ratio of post-overload feature activation stiffness to pre-activation stiffness.

According to some embodiments of the present invention, as depicted for example in FIGS. 8-11, the length of deformable beams—but not overload beams—is increased by forming a serpentine deformable beam. As used herein, the term "serpentine" means a shape that deviates from a straight line by curving or bending alternately to one side and then the other. In other words, a directed path taken down the centerline of the serpentine deformable beam, along its length from a point of attachment to the TAP to a point of attachment to the MAP (or vice versa), deviates from being a straight line by turning, curving, or angling at least once to the left (or right), and then further deviates from being a straight line by turning, curving, or angling at least once to the right (or left). Of course, the serpentine deformable beam may deviate to both the left and right numerous times along its extent from the TAP to a point of attachment to the MAP. The alternate deviations need not be consecutive—that is, the serpentine deformable beam may make a plurality of turns to the same direction, and then make a turn to the opposite direction. The deviation from a straight line may be in the form of a sharp angle, or may be a gradual curve. Note that a directed path which experiences only one deviation from straight line, i.e., to the left or the right, but not both (such as the deformable beams 16 of FIG. 1) is not encompassed within the meaning of "serpentine" as that term is used herein.

In one embodiment, the serpentine deformable beam may comprise a plurality of straight beam segments connected at various angles, and some of these segments may run parallel to each other, so as to achieve a greater total deformable beam length, while confining the serpentine deformable beam to a small space. In some embodiments, a segment or portion of the serpentine deformable beam may "fold back," or run in a direction opposite to a prior segment or portion of the beam.

Figure 8:
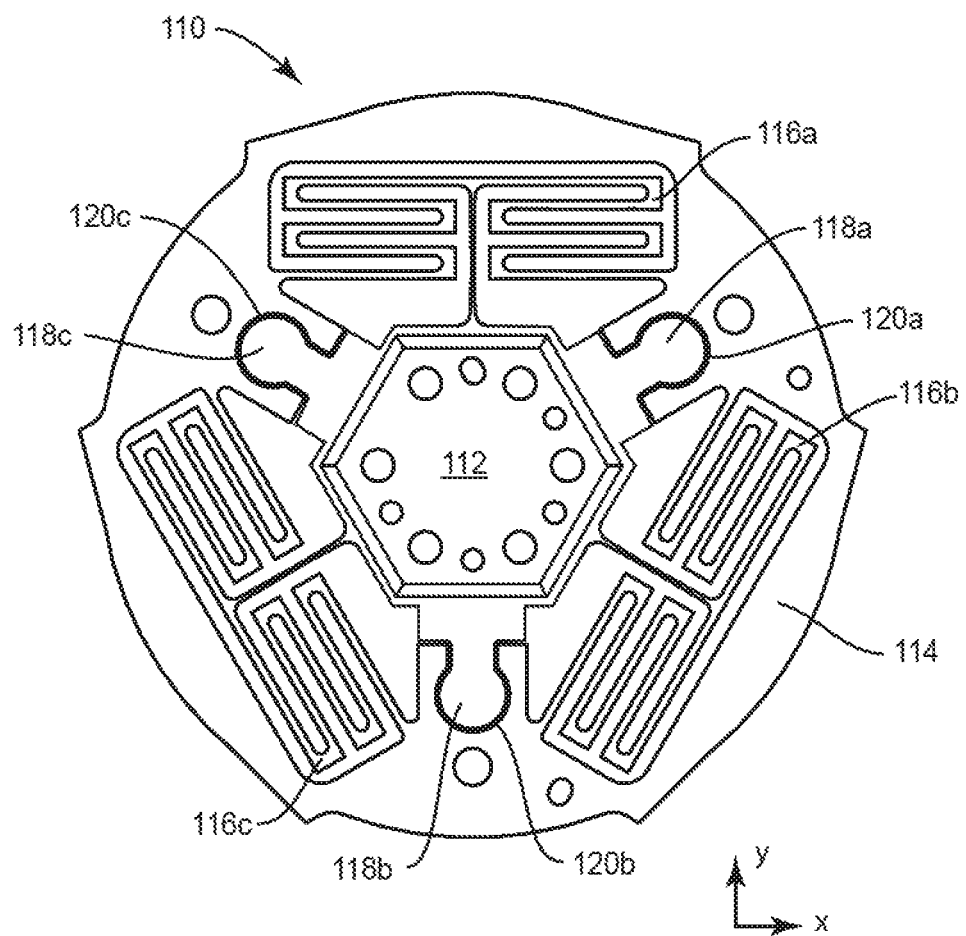
FIG. 8 is a plan view of a force/torque sensor having serpentine deformable beams according to one embodiment.

FIG. 8 depicts a force/torque sensor 110, comprising a Tool Adapter Plate (TAP) 112, which may be connected to a tool, and a Mounting Adapter Plate (MAP) 114, which may be connected to a robotic arm (or vice versa). The MAP 114 is arranged generally annularly around the TAP 114. A plurality of serpentine deformable beams 116a, 116b, 116c, each comprising a plurality of deformable beam segments connected at angles, connect the TAP 112 to the MAP 114. In the embodiment depicted in FIG. 8, each serpentine deformable beam 116 includes a first portion that connects to the TAP 112. This first portion then connects, via a "T" connection, to a second portion. At each end of the second portion, the serpentine deformable beam then "folds" in a serpentine manner. Each of these serpentine sections then connects to the MAP 114. Accordingly, in this embodiment, each serpentine deformable beam 116 includes two separate directed paths from the point of attachment to the TAP 112, to two different points of attachments to the MAP 114. Each of these directed paths define a serpentine shape, as that term is defined and used herein.

Due to their extended overall length, the serpentine deformable beams 116 allow slight relative motion between the TAP 112 and MAP 114, in the x-y plane as well as in the z-direction (out of the paper) with a relatively low stiffness. That is, the sensor 110 has a greater degree of "looseness" or "play" within its operating range than, for example, a comparably sized sensor with the straight-line or T-shaped deformable beams of the prior art designs depicted in FIGS. 1-3. The serpentine deformable beams 116 are instrumented with strain gages (not shown) on one or more sides, which transduce compressive and tensile forces at the surface(s) of the serpentine deformable beams 116 into electrical signals. The strain gages may be wired in a full-, half-, or quarter-Wheatstone bridge configurations, as known in the art. A data acquisition and processing system (not shown) processes the strain gage outputs to resolve, e.g., six forces and torques acting between the TAP 112 and MAP 114 (Fx, Fy, Fz, Tx, Ty, Tz), as known in the art.

The force/torque sensor 110 also includes a plurality of overload beams 118a, 118b, 118c extending from the TAP 112 at a first end to near—but not touching—the MAP 114 at a second end (or vice versa). The overload beams 118 are radially interspersed between the serpentine deformable beams 116. A narrow overload gap 120a, 120b, 120c, for example, from a few tens of thousandths of an inch to a few thousands of an inch, separates each respective overload beam 118a, 118b, 118c from the MAP 114. Indeed, the overload gap 120 defines the second (non-connected) end of each overload beam 118. In some embodiments, the TAP 112, serpentine deformable beams 118, overload beams 118, and MAP 114 are machined from a single piece of metal, which removes stackup tolerances from the overload feature manufacture.

In one embodiment, each overload gap 120 is substantially circular. With three overload beams, as depicted, the circular gap 120 must extend greater than 270-degrees of the circumference of a circle, so it will contact in enough orientations to ensure there are no directions in which the TAP 112 can travel with a different gap distance. A uniform gap distance, or one which is specifically offset in different directions to allow different activation distances in Fxy/Tz, for example with four overload beams, is the driving factor for when the overload beams 118 contact the MAP 114. The exact path the gap 120 follows, i.e., circular, oval, etc., determines the local contact stress when the overload beam 118 contacts the MAP 114. In one embodiment, the overload gaps 120 may be formed using wire electrical discharge machining (EDM), which allows for easy machining of the gaps 120 with tight tolerances. In contrast to the serpentine deformable beams 116, the overload beams 118 are straight, without any bends or angles, and are both shorter and thicker than the serpentine deformable beams 116. Consequently, they exhibit much higher stiffness.

The overload gaps 120 between the overload beams 118 and MAP 114 provide an overload actuation, or stop, for forces (Fxy) and torques (Tz) that move the TAP 112 relative to the MAP 114 in the x-y plane. To provide an overload stop for motion in the z-direction (out of the page), flat plates are attached above and below the area where each overload beam 118 meets the MAP 114—that is, over and under the overload gaps 120—with shim stock defining a small gap width. Alternatively, the plates covering this area may have a precise step machined into them. Hence, all of the overload stops are created with small gaps and tight tolerances, using readily-available technology that does not threaten to damage the sensor 110, and does not add appreciably to the manufacturing process. One alternate embodiment of overload stop features for the z-direction is to have both flats and a taper machined into plates above and below the sensing element. The flats can be placed closer to the center of the transducer and a taper continues out from the flats so a pure force overload and a torque overload both have large contact areas during an overload event, which reduces contact stresses and again improves fatigue life/strength.

Figure 9:
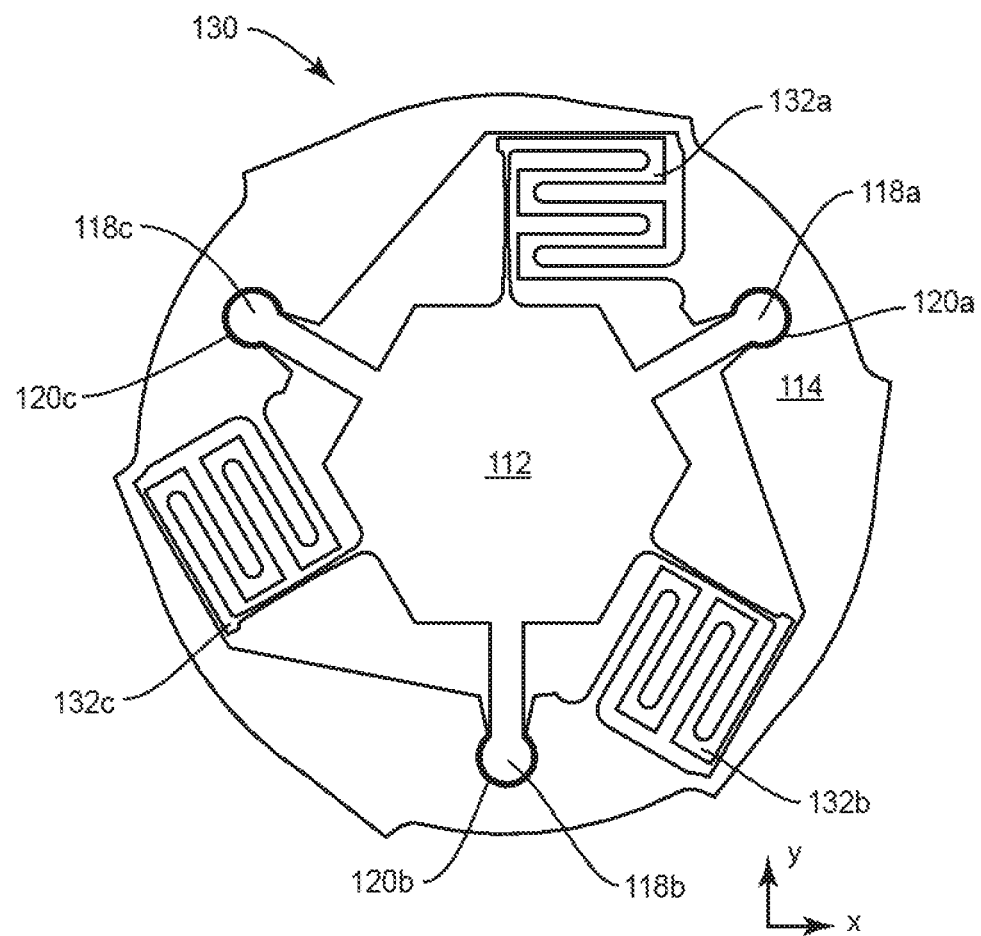
FIG. 9 is a plan view of a force/torque sensor having serpentine deformable beams according to another embodiment.

FIG. 9 depicts a force/torque sensor 130 according to another embodiment. In this embodiment, serpentine deformable beams 132a, 132b, 132c are connected between the TAP 112 and MAP 114. Each serpentine deformable beam 132 in this embodiment is connected to each of the TAP 112 and MAP 114 at one point only. The serpentine deformable beams 132 are "folded" similarly to the embodiment of FIG. 8, providing an extended overall length but within a small space. The MAP 114 body may take up part of the space occupied by the other "half" of the serpentine deformable beam 116 of the embodiment of FIG. 8, further contributing to post-overload activation stiffness of the overall sensor 130. The overload beams 118 and overload gaps 120 are constructed as described above.

Figure 10:
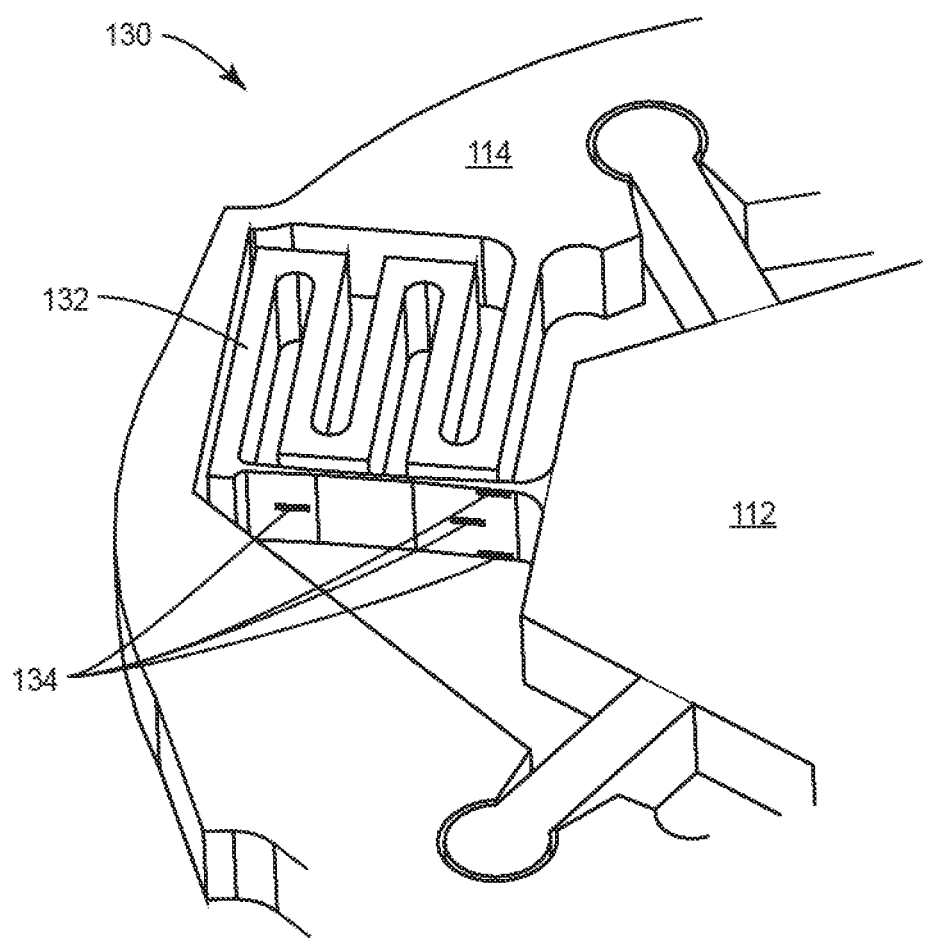
FIG. 10 is a perspective view of one serpentine deformable beam of the force/torque sensor of FIG. 9.

FIG. 10 shows the details of one serpentine deformable beam 132 of the embodiment of FIG. 9, with strain gages 134 attached. The strain gage attachment may be similar on serpentine deformable beams 116 of the embodiment of FIG. 8. Wring of the strain gages is not shown for clarity. Although shown on one surface, strain gages may be attached to the serpentine deformable beams 116, 132 on multiple surfaces (e.g., in pairs on opposite faces), and in any position or orientation.

Although the serpentine deformable beams 116, 132 depicted in FIGS. 8-10 depict parallel runs of lengths of segments of the beams 116, 132, connected at opposite ends to the next successive segment, and thus forming a "fan-folded" shape, this shape is exemplary only and is not limiting.

Figure 11:
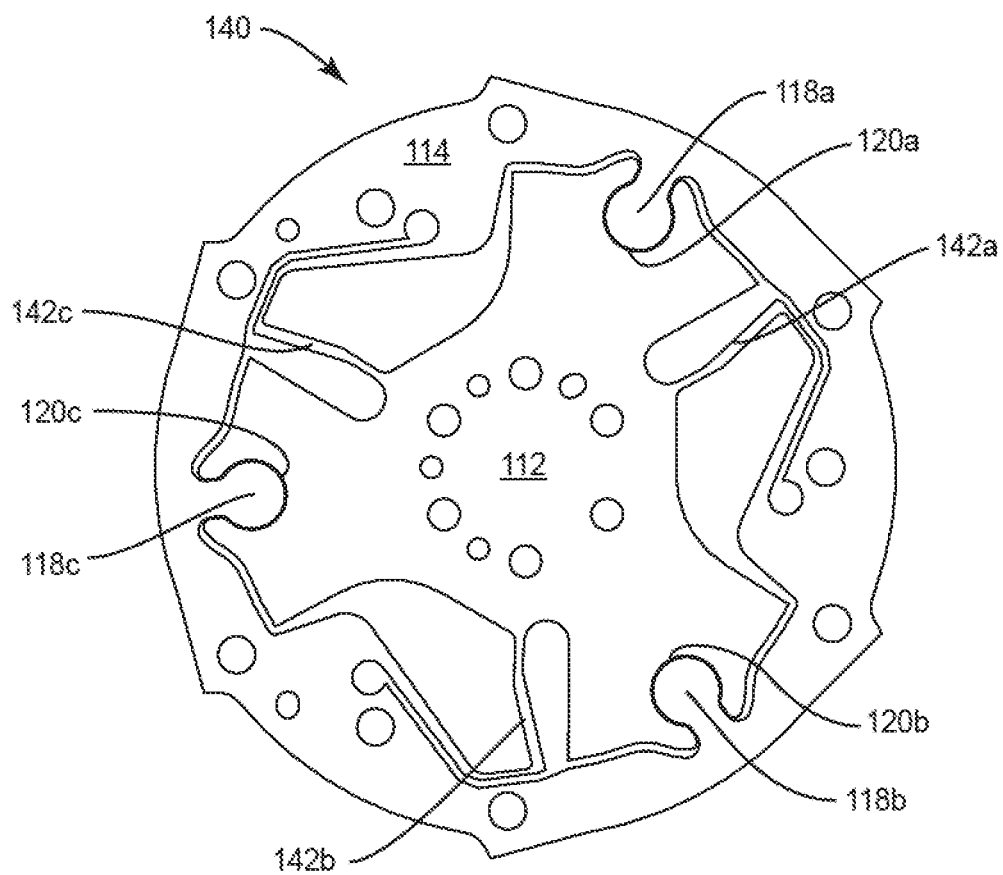
FIG. 11 is a plan view of a force/torque sensor having serpentine deformable beams according to another embodiment.

FIG. 11 depicts yet another embodiment of a force/torque sensor 140 with serpentine deformable beams 142. In this case, the serpentine deformable beams 142a, 142b, 142c each exhibit only a slight bend to the left after the attachment point on the TAP 112, followed by several turns to the right before attaching to the MAP 114. However, because the beams 142 each deviate from a straight line by curving or bending alternately to one side (the left) and then the other (repeatedly to the right), they meet the definition of a "serpentine" beam, as used herein.

Figure 12A:
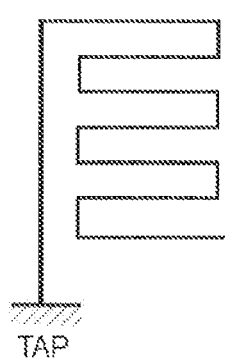
FIGS. 12a-c depict various serpentine deformable beam shapes.
Figure 12B:
Figure 12C:
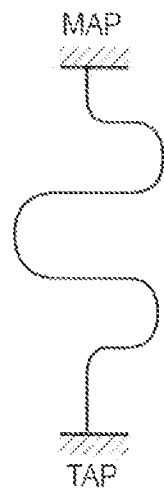

FIG. 12 depicts a variety of deformable beam shapes, all of which are "serpentine," as that term is defined herein.

Deformable beam shape 12(a) is similar to that depicted in FIGS. 9 and 10 (or one side of the embodiment of FIG. 8). A directed line from the TAP attachment point to a MAP attachment point proceeds in a straight line, then deviates from the straight line with a 90-degree right turn. The beam then performs six 180-degree changes of direction, each comprising two consecutive 90-degree turns to the same side. This is an example of a serpentine deformable beam, which deviates from a straight line in both directions, but not consecutively. As used herein, a deviation from a directed line down the centerline of a deformable beam is a deviation from the instantaneous centerline, as the point of consideration moves along the beam—the deviation is not necessarily to either side of the initial centerline.

Shape 12(b) depicts another embodiment of a serpentine path for a deformable beam. Beginning at the TAP attachment point, the beam runs in a straight line, then makes a left turn of less than 90-degrees, a right turn greater than 90-degrees, another left turn greater than 90-degrees, then another right turn less than 90-degrees, before continuing in a straight line to the MAP attachment point. A bend in a serpentine deformable beam may be an arcuate, right, or obtuse angle from the directed line down the beam's centerline.

Shape 12(c) depicts yet another embodiment of a serpentine path for a deformable beam. This shape has no hard angles. However, a directed path along the centerline of a beam experiences a curve of 90-degrees to the right, then left, right, and left curves each totaling 180-degrees of deviation, followed by a 90-degree curve to the right to meet the MAP attachment point. Although the beam has no hard angles, its directed path deviates from a straight line in both directions, and hence meets the definition of serpentine, as used herein.

According to other embodiments of the present invention, the length of deformable beams—but not overload beams—is increased by forming a spiral deformable beam. As used herein, the term "spiral" means a shape that deviates from a straight line by curving or bending repeatedly or continuously to the same side, for a cumulative total of greater than 90-degrees. In other words, a directed path taken down the centerline of the spiral deformable beam, along its length from a point of attachment to the TAP to a point of attachment to the MAP, deviates from being a straight line by turning, curving, or angling a plurality of times, or continuously, in one direction—i.e., either to the left or to the right, through a cumulative sum of greater than 90-degrees. Note that a directed path which experiences deviation from a straight line in one direction for a sum total equal to or less than 90-degrees (such as the deformable beams 16 of FIG. 1) is not encompassed within the meaning of "spiral" as that term is used herein.

Figure 14:
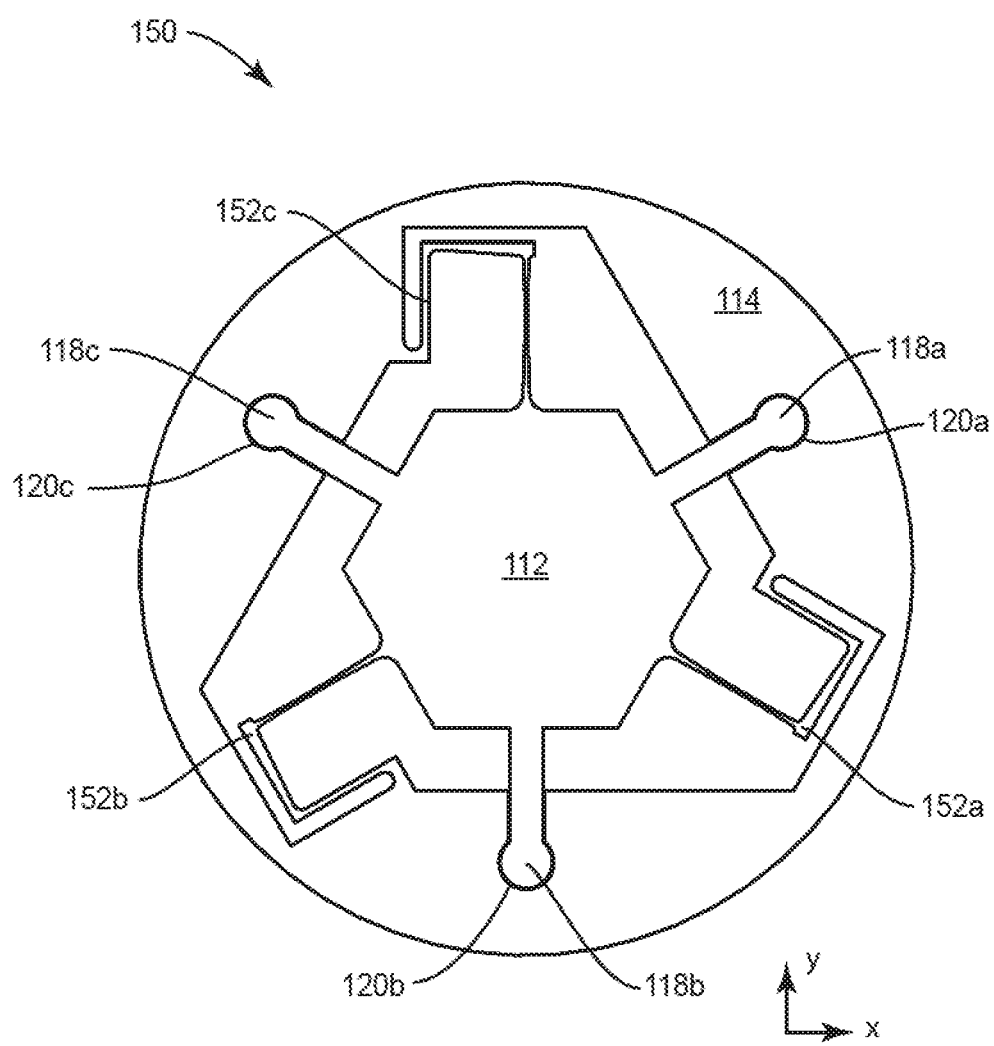
FIG. 14 is a plan view of a force/torque sensor having spiral deformable beams according to one embodiment.

FIG. 14 depicts an embodiment of a force/torque sensor 150 with spiral deformable beams 152. In this case, the spiral deformable beams 152a, 152b, 152c each exhibit turns to only one side—to the left—for a total of 180-degrees. This exceeds the cumulative minimum total of deviations to one side of greater than 90-degrees, according to the definition of spiral deformable beam used herein.

Figure 13A:
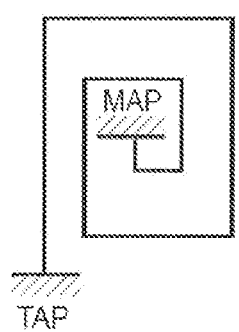
FIGS. 13a-c depict various spiral deformable beam shapes.
Figure 13B:
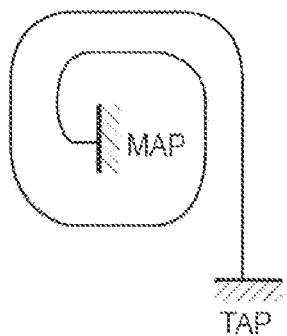
Figure 13C:

FIG. 13 depicts numerous examples of a "spiral" deformable beam shape, as that term is used herein.

Deformable beam shape 13(a) comprises a series of eight 90-degree turns, all to the right. The cumulative deviation, to the right, of a directed line from the point of attachment to the TAP to the point of attachment to the MAP is 720-degrees. In this embodiment, at least part of the MAP must be positioned out of the plane of the spiral deformable beam in order to attach to it.

Shape 13(b) depicts another embodiment of a spiral path for a deformable beam. Beginning at the TAP attachment point, the beam runs in a straight line, then makes continuous, curving deviation to the left. The beam coils through 1¾ complete circles before attaching to the MAP. The total deviation in direction—all to the same side (the left in this case)—is 630-degrees. This embodiment also requires the MAP (or an arm or other member that connects to it) to be positioned out of the plane of the spiral deformable beam.

Shape 13(c) depicts yet another embodiment of a spiral path for a deformable beam. In this embodiment, a beam extends from a point of attachment to the TAP, through a series of left turns, to a point of attachment to the MAP. Since the first and final segments of this compound beam are not parallel, the total angular deviation, to the left, from the straight line leaving the TAP is somewhat greater than 180-degrees, and hence clearly within the definition herein of a deviation greater than 90-degrees. In this embodiment, the TAP and MAP may be formed in the same plane as the spiral deformable beam.

In embodiments of the present invention, the lengths of the serpentine deformable beams 116, 132, 142 or spiral deformable beams 152 are increased to reduce their stiffness; however, the overall size of the force/torque sensor 110, 130, 140, 150 is not increased, due to "folding" the serpentine deformable beams 116, 132, 142 or spiral deformable beams 152 within a space between the TAP 112 and MAP 114. The lower stiffness of these serpentine deformable beams 116, 132, 142 or spiral deformable beams 152 increases the ratio of sensor stiffness after overload actuation to the stiffness during the operating range of applied loads, while yielding proportional strain readings. This arrangement allows for the use of readily-manufactured overload features.

Throughout the designed, or rated, operating range of the force/torque sensor 110, 130, 140, 150, strain gages on the serpentine deformable beams 116, 132, 142 or spiral deformable beams 152 detect compressive and tensile forces induced in these members by forces and/or torques applied between the TAP 112 and MAP 114. Due to their large overall length, the serpentine deformable beams 116, 132, 142 or spiral deformable beams 152 may experience flex, or deformation, allowing slight relative movement between the TAP 112 and MAP 114.

When the maximum designed force and/or torque is applied to the sensor 110, 130, 140, 150 and one or more of the serpentine deformable beams 116, 132, 142 or spiral deformable beams 152 has deformed, or flexed, allowing the maximum designed relative motion between the TAP 112 and MAP 114, one or more overload beams 118 will close the associated gap 120, and directly contact either the MAP 114 or a plate positioned above or below the sensor 110, 130, 140, 150. At this point, further relative movement is nominally halted. In reality, there will be continued, very slight movement, as the overload beams 118 and MAP 114 are not infinitely stiff. However, any such movement, which will be detected and output as further strain on the serpentine deformable beams 116, 132, 142 or spiral deformable beams 152, increases at a rate less than that experienced during the operating range of applied forces/torques. That is, the strain/force output curve will resemble that of FIG. 6, rather than FIG. 5.

Embodiments of the present invention present numerous advantages over force/torque sensors of the prior art. Due to the greater overall length of the serpentine deformable beams 116, 132, 142 or spiral deformable beams 152, the stiffness of these members is lowered without affecting their strain. This provides a substantial difference to the stiffness of the overload features 118, increasing the ratio of sensor stiffness after overload actuation to that prior to overload actuation (i.e., within the normal operating range). This high ratio of stiffness yields a sharp inflection in the strain/force curve at the point of overload actuation, with a low slope as increasing load is applied. This increases the number of cycles in which the sensor 110, 130, 140, 150 can go into overload condition before fatiguing the metal, and increases the maximum force/torque the sensor 110, 130, 140, 150 can withstand without yielding or breaking. The approach of increasing the overall length of deformable beams 116, 132, 142, 152 by forming them in a serpentine or spiral shape yields efficient space utilization, which does not increase the overall sensor size. Defining the non-connected ends of overload beams 118 by forming overload gaps 120 in the MAP 114 loosens the tolerances on overload features 118, as compared to prior art approaches, and eliminates the need to machine parts after assembly.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A force/torque sensor, comprising:
   a Tool Adapter Plate (TAP) operative to be connected to a first object:
   a Mounting Adapter Plate (MAP) operative to be connected to a second object;
   one or more deformable beams connecting the TAP to the MAP, each deformable beam comprising at least one of
      a serpentine deformable beam, wherein at least one directed path taken down the centerline of the serpentine deformable beam from a point of attachment to the TAP to a point of attachment to the MAP deviates from an instantaneous straight line at least once to the left and at least once to the right, and
      a spiral deformable beam, wherein at least one directed path taken down the centerline of the spiral deformable beam from a point of attachment to the TAP to a point of attachment to the MAP deviates from an instantaneous straight line to one of the left or the right, and wherein the cumulative sum of such deviation is 90-degrees or greater;
   strain gages affixed to one or more surfaces of at least some of the serpentine or spiral deformable beams, the strain gages operative to transduce strains in a serpentine or spiral deformable beam, caused by deformation of the beam, into signals; and
   a measurement circuit operative to measure, in response to signals from all strain gages, the direction and magnitude of force and torque between the first and second objects.

2. The force/torque sensor of claim 1 further comprising, for each overload beam, plates affixed above and below the MAP or TAP that are separated from the overload beam by an overload gap, the plates defining a z-direction gap limiting the overload beam movement normal to a common plane of the TAP, MAP, and overload beam.

3. The force/torque sensor of claim 2 further comprising shim stock defining the z-direction gap.

4. The force/torque sensor of claim 2 wherein the plates are machined to define the z-direction gap.

5. A force/torque sensor, comprising:
   a Tool Adapter Plate (TAP) operative to be connected to a first object:
   a Mounting Adapter Plate (MAP) operative to be connected to a second object;
   one or more serpentine deformable beams connecting the TAP to the MAP, wherein at least one directed path taken down the centerline of the serpentine deformable beam from a point of attachment to the TAP to a point of attachment to the MAP successively deviates from an instantaneous straight line at least once to the left and at least once to the right;

strain gages affixed to one or more surfaces of at least some of the serpentine deformable beams, the strain gages operative to transduce strains in a serpentine deformable beam, caused by deformation of the beam, into signals; and a measurement circuit operative to measure, in response to signals from all strain gages, the direction and magnitude of force and torque between the first and second objects.

6. The force/torque sensor of claim 5 further comprising:
one or more overload beams connected to one of the TAP and MAP at a first end, and separated from the other of the TAP and MAP at a second end by an overload gap of a predetermined width, each overload beam exhibiting a greater stiffness than a serpentine deformable beam.

7. The force/torque sensor of claim 6 wherein the overload gap is formed by a part distinct from either the TAP or MAP, which is rigidly attached to one of the TAP or MAP, and which forms the overload gap with the other of the TAP or MAP.

8. The force/torque sensor of claim 5 wherein each serpentine deformable beam comprises a plurality of parallel deformable beam segments connected in a serpentine configuration between the TAP and MAP.

9. The force/torque sensor of claim 5 wherein each serpentine deformable beam comprises:
a first segment;
first and second serpentine sections each connected between the first segment and a separate points of one of the MAP and TAP; and
a second segment connected between the first segment and the other of the MAP and TAP.

10. The force/torque sensor of claim 5 wherein each of a plurality of overload beams is radially interspersed between each of a plurality of serpentine deformable beams.

11. The force/torque sensor of claim 5 wherein each overload gap is substantially circular.

12. The force/torque sensor of claim 5 further comprising, for each overload beam, plates affixed above and below the MAP or TAP that are separated from the overload beam by an overload gap, the plates defining a z-direction gap limiting the overload beam movement normal to a common plane of the TAP, MAP, and overload beam.

13. The force/torque sensor of claim 12 further comprising shim stock defining the z-direction gap.

14. The force/torque sensor of claim 12 wherein the plates are machined to define the z-direction gap.

15. The force/torque sensor of claim 5 wherein:
within a first range of forces or torques applied between the TAP and MAP, the serpentine deformable beams are operative to deform, and wherein the second end of the overload beams do not contact the TAP or MAP due to the overload gap; and
within a second range of forces or torques applied between the TAP and MAP that is greater than the first range, the second end of at least one overload beam closes the overload gap and contacts the TAP or MAP, preventing further motion between the TAP and MAP and hence nominally preventing further deformation of the serpentine deformable beams.

16. The force/torque sensor of claim 15 wherein the sensor exhibits a first stiffness, or resistance to movement under the applied force or torque, throughout the first range of forces or torques, and a second stiffness in the second range of forces or torques, wherein the second stiffness is greater than the first stiffness.

17. The force/torque sensor of claim 16 wherein the ratio of second stiffness to first stiffness is 5 or greater.

18. The force/torque sensor of claim 17 wherein the ratio of second stiffness to first stiffness is 10 or greater.

19. A force/torque sensor, comprising:
a Tool Adapter Plate (TAP) operative to be connected to a first object;
a Mounting Adapter Plate (MAP) operative to be connected to a second object;
one or more spiral deformable beams connecting the TAP to the MAP, wherein at least one directed path taken down the centerline of the spiral deformable beam from a point of attachment to the TAP to a point of attachment to the MAP deviates from an instantaneous straight line to one of the left or the right, and wherein the cumulative sum of such deviation is greater than 90-degrees;
strain gages affixed to one or more surfaces of at least some of the spiral deformable beams, the strain gages operative to transduce strains in a spiral deformable beam, caused by deformation of the beam, into signals; and
a measurement circuit operative to measure, in response to signals from all strain gages, the direction and magnitude of force and torque between the first and second objects.

20. The force/torque sensor of claim 19 further comprising:
one or more overload beams connected to one of the TAP and MAP at a first end, and separated from the other of the TAP and MAP at a second end by an overload gap of a predetermined width, each overload beam exhibiting a greater stiffness than a spiral deformable beam.

21. The force/torque sensor of claim 20 wherein the overload gap is formed by a part distinct from either the TAP or MAP, which is rigidly attached to one of the TAP or MAP, and which forms the overload gap with the other of the TAP or MAP.

22. The force/torque sensor of claim 19 wherein each of a plurality of overload beams is radially interspersed between each of a plurality of spiral deformable beams.

23. The force/torque sensor of claim 19 wherein each overload gap is substantially circular.

24. The force/torque sensor of claim 19 wherein:
within a first range of forces or torques applied between the TAP and MAP, the spiral deformable beams are operative to deform, and wherein the second end of the overload beams do not contact the TAP or MAP due to the overload gap; and
within a second range of forces or torques applied between the TAP and MAP that is greater than the first range, the second end of at least one overload beam closes the overload gap and contacts the TAP or MAP, preventing further motion between the TAP and MAP and hence nominally preventing further deformation of the spiral deformable beams.

25. The force/torque sensor of claim 24 wherein the sensor exhibits a first stiffness, or resistance to movement under the applied force or torque, throughout the first range of forces or torques, and a second stiffness in the second range of forces or torques, wherein the second stiffness is greater than the first stiffness.

26. The force/torque sensor of claim 25 wherein the ratio of second stiffness to first stiffness is 5 or greater.

27. The force/torque sensor of claim 25 wherein the ratio of second stiffness to first stiffness is 10 or greater.

* * * * *